No. 714,051. Patented Nov. 18, 1902.
G. K. SPITZENBERG.
SOWING APPARATUS.
(Application filed Aug. 15, 1901.)

(No Model.) 2 Sheets—Sheet 1.

Witnesses:
Walton Harrison
Paul Hunter

Inventor
Georg K. Spitzenberg
per Munn
Attorney

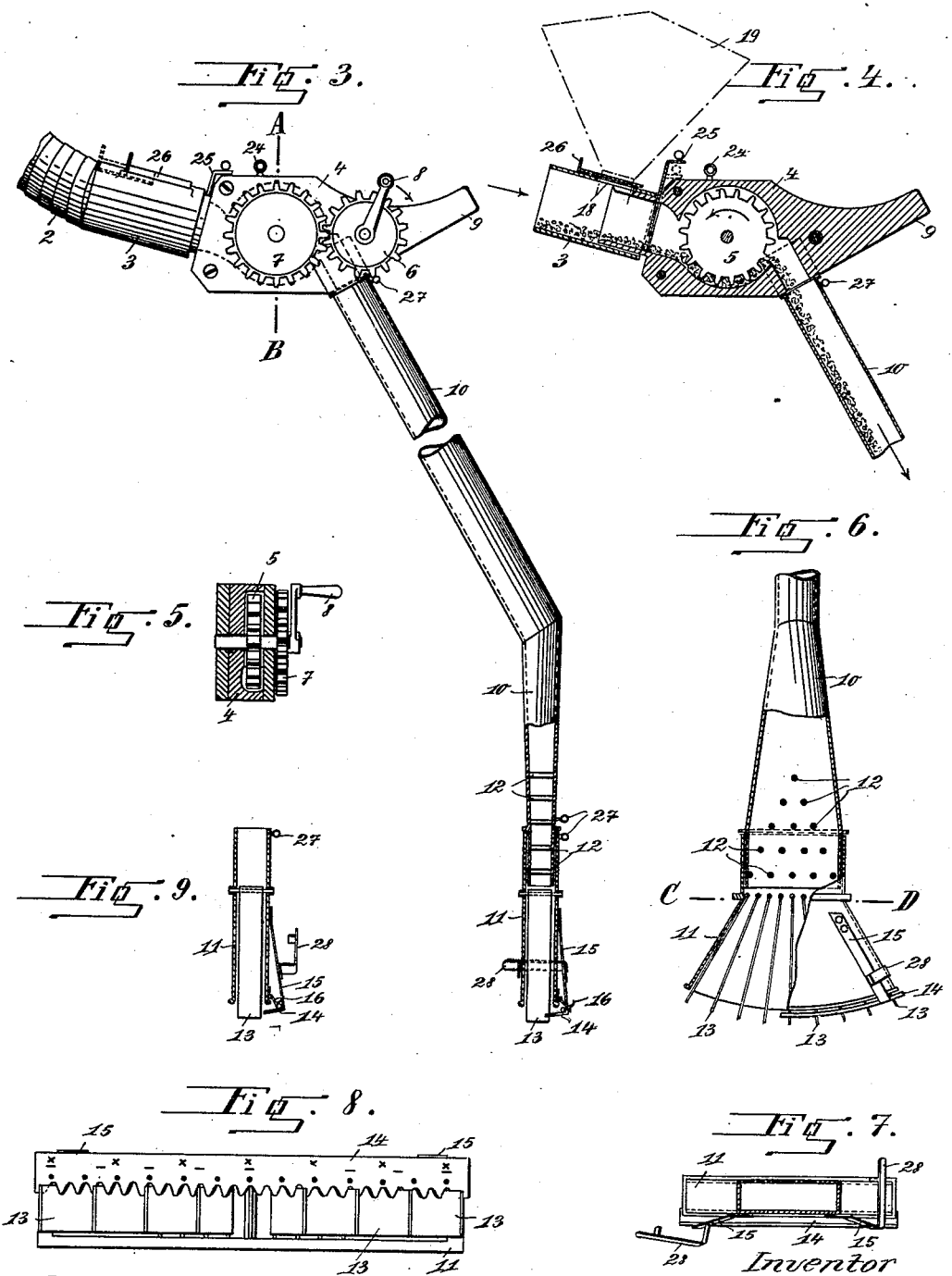

UNITED STATES PATENT OFFICE.

GEORG KARL SPITZENBERG, OF FORSTHAUS LEUENBERGERWIESEN, NEAR EBERSWALDE, GERMANY.

SOWING APPARATUS.

SPECIFICATION forming part of Letters Patent No. 714,051, dated November 18, 1902.

Application filed August 15, 1901. Serial No. 72,102. (No model.)

*To all whom it may concern:*

Be it known that I, GEORG KARL SPITZENBERG, a subject of the Emperor of Germany, and a resident of Forsthaus Leuenbergerwiesen, near Eberswalde, Germany, have invented certain new and useful Improvements in Planters, of which the following is a full, clear, and exact description.

The present invention relates to a sowing apparatus for use in forestry, agriculture, and horticulture which is carried in the manner of a knapsack. This sowing apparatus can be used with all kinds of seed and under any conditions of ground and soil—for instance, in mountainous districts where vehicular apparatus cannot be used.

In the annexed drawings one form of the apparatus is represented.

Figure 1:
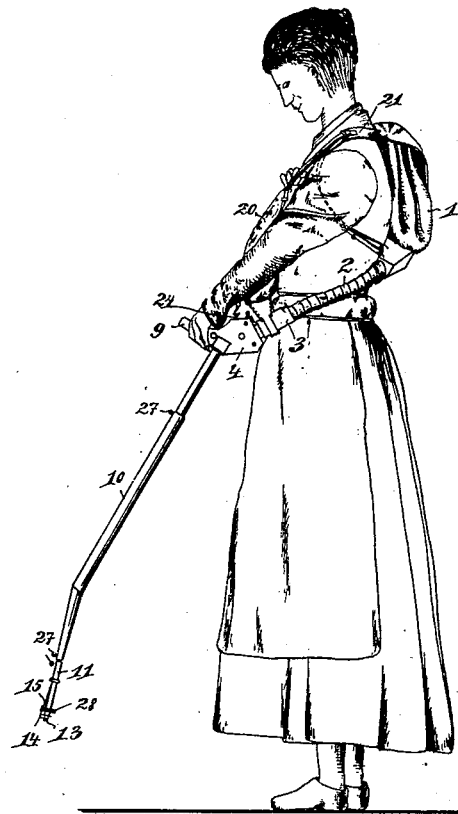
Figure 2:
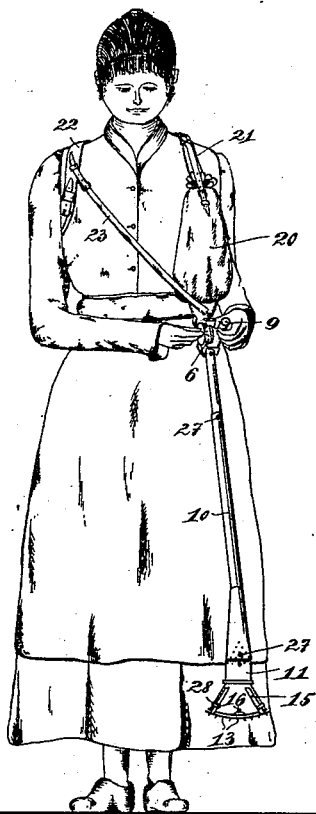
Figure 11:
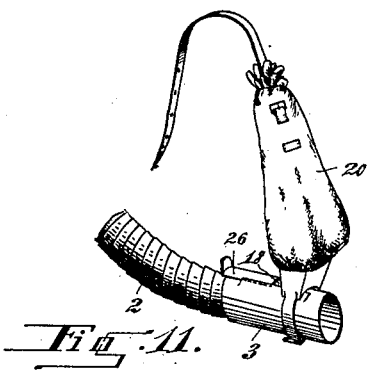
Figure 10:
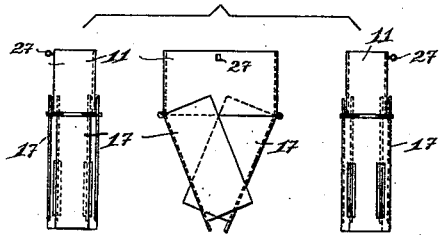

Figures 1 and 2 respectively represent a side view and front view thereof in use. Fig. 3 is a side view of the actual sowing apparatus with the seed-tube. Fig. 4 is a vertical and horizontal longitudinal section of Fig. 3 with the lower part of the seed-tube omitted. Fig. 5 is a section of Fig. 3 on the line A B. Fig. 6 is a front view of the seed-nozzle, partly in section. Fig. 7 is a section of Fig. 6 on the line C D. Fig. 8 is a plan view from below of the seed-nozzle on a larger scale. Fig. 9 is a side view of the seed-nozzle. Fig. 10 shows a front view and both side views of a modification of the seed-nozzle. Fig. 11 represents a plan view of an auxiliary seed-holding receptacle.

The sack 1, Fig. 1, which serves as the seed-holding receptacle, is connected with a tube 2, the latter preferably consisting of helically-twisted sheet-steel and being so constructed that it can be lengthened or shortened. This tube 2 is connected by means of a sleeve or socket 3 with a hopper 4, Fig. 3, through which the seed is conveyed into the seed-tube 10 by a wheel 5, Fig. 4, revolved by gear-wheels 6 and 7, Fig. 5, arranged outside the hopper. From the seed-tube the seed passes into the nozzle 11, being preferably detachable, from which it passes to the soil. In sowing, the hopper 4 is held in the left hand by means of a handle 9, Figs. 1 and 2, the crank 8 on the shaft of the wheel 6 being revolved by the right hand. In order to evenly distribute the seed in the tube 10 above the nozzle, bars 12, Figs. 3 and 6, are provided in the tube, and in order to regulate the spread of the seed the nozzle 11 is divided by partitions 13, Fig. 6, into several divisions, the said partitions being movable and adjustable. A notched and marked bar 14, Figs. 6, 7, and 8, by which the partitions are held in position and which is attached to springs 15, can be raised and held back by means of a pivoted support 16 during the adjustment of the partitions. In its working position the said bar 14 is held fast by lateral pivoted catches or hooks 28.

Instead of the nozzle described another suitable nozzle may be attached to the lower end of the tube 10—for instance, the nozzle 11 shown in Fig. 10, which consists of a base portion of rectangular shape and two side pieces 17, hinged thereto and fitting into each other, the lower part of one side piece engaging slots in the lower part of the other side piece.

For sowing so-called "full" seeds—that is to say, for sowing the broadest possible strips—a seed-nozzle of any desired breadth may be attached to the seed-tube. To prevent the displacement or sliding off of the nozzle 11 and the separate parts of the tube 10, eyes 27 are provided, which may be connected by means of a cord or wire.

In order that in sowing small quantities of seed or different kinds of seed which have to be changed at frequent intervals the seed-sack need not be repeatedly removed for the purpose of putting in seed, the sleeve or socket 3, connecting the tube 2 with the hopper 4, is provided with an opening 18, Fig. 4, with which a small seedbox 19 or a seed bag or tube 20 is connected, being preferably fastened to the left-shoulder strap 21 of the sack by means of a buckle. When the seed-holding receptacle 19 or 20 is not in use, the opening 18 is closed by a slide 26, Figs. 3, 4, and 11.

The ends of the shoulder-straps 21 and 22 may be passed through two rings attached to the metal bottom of the sack and buckled in front, as shown in Figs. 1 and 2. At the lower end of an auxiliary strap 23, attached to the right-shoulder strap 22, a hook is provided which can be hooked into a ring or eye 24, Figs. 1 and 3, on the hopper 4. The shoulder-straps 21 and 22 and the auxiliary strap 23 are adjusted according to the height and bulk of the person carrying the seed-sack.

To render it possible to regulate the supply of seed to the wheel 5, a slide 25, Figs. 3 and 4, is provided in the conduit 2 3, leading to the hopper 4. The regulation of the quantity of seed delivered is effected by using driving-wheels 6 and 7 of different sizes. The unit of length of the line of sowing is preferably based on the length of a normal step or stride, to each of which one revolution of the crank will correspond.

Since the spread of the seed and the straightness of the lines sown may be influenced by the distance of the seed-nozzle from the ground, particularly in windy weather, the tube 10 is so constructed that it can be drawn out or pushed together telescopically, and the nozze 11 thus moved close to the ground or away from the latter, as desired. If the seed is of such a nature that it may become clogged on its passage from the seed-sack to the wheel 5, a suitable stirring device operated by the wheels 6 and 7 may be arranged in the tube 2 to insure a continuous supply or passage of seed.

The seed may of course be conveyed out of the hopper 4 by means of a scoop-wheel or any other suitable means.

Having thus described my invention, I claim as new and desire to secure by Letters Patent—

1. A planter, comprising a seed-holder, means for securing the same upon the back, a seed-distributer being carried in front of the person and operated by the hands, a conduit directly connecting said seed-holder and seed-distributer, a nozzle for discharging the seed, a seed-tube for connecting said nozzle and seed-distributer, the said seed-tube being provided with distributers adjacent to the nozzle, and partitions in said nozzle.

2. A planter, comprising a main seed-holder, means for securing the same upon the back, a seed-distributer being carried in front of the person and connected with said main seed-holder by suitable means, an auxiliary seed-holder connected with said seed-distributer, and means for controlling the communication between said auxiliary seed-holder and said seed-distributer.

In testimony whereof I have signed my name to this specification, this 27th day of July, 1901, in the presence of the subscribing witnesses.

GEORG KARL SPITZENBERG.

Witnesses:
WOLDEMAR HAUPT,
HENRY HASPER.